April 23, 1968   C. R. FREEMAN   3,379,562
SELF-ADHERING SHEET PRODUCT
Filed Aug. 17, 1964
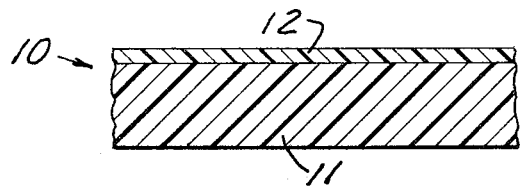
INVENTOR.
CHARLES R. FREEMAN
BY
Carpenter, Kinney & Boulter
ATTORNEYS United States Patent Office 3,379,562
Patented Apr. 23, 1968

3,379,562
SELF-ADHERING SHEET PRODUCT
Charles R. Freeman, St. Paul, Minn., assignor to Minnesota Mining and Manufacturing Company, St. Paul, Minn., a corporation of Delaware
Filed Aug. 17, 1964, Ser. No. 390,181
6 Claims. (Cl. 117—122)

ABSTRACT OF THE DISCLOSURE

A self-adhering tape carrying a thin substantially non-tacky substantially continuous barrier layer on one surface that prevents the convolutions of the tape in a storage roll from adhering. The barrier layer separates into small particles when the tape is stretched during application, so as to permit adhesion between adjacent convolutions.

---

This invention concerns self-adhering, including self-fusing, elastomeric sheet products, especially electrical insulating tapes.

Electrical insulating self-adhering tapes are especially used in cable splices to provide insulation replacing that initially removed from the conductors. These tapes are simply strips, wound into rolls, of stretchable elastic, rubbery sheet materials of high dielectric strength which, when elongated or stretched more than about 50% beyond their natural dimensions and overlapped, have the property that the overlapped portions self-adhere, or self-fuse to one another. As the tapes are stretched and wrapped around an electrical cable or the like, the spirally lapping layers tend to lose their identity and, most desirably, form a unitary sheath as the layers fuse to one another. Tapes of this kind have been long known to the art and the earlier tapes of this kind were simply natural rubber based sheet materials. Later tapes usually combine natural or synthetic rubbers, usually polyisobutylene and butyl rubbers, with other materials, such as polyethylene, to achieve improvement in specific properties, e.g. see Patents Nos. 2,462,977 and 2,569,540.

Since the sheaths provided by self-adhering tapes have a less pronounced spiral lamination than do insulating sheaths provided by adhesive coated tapes which have a non-self-adhering backing or low adhesion backsizing, they are less subject to weathering, as by penetration by moisture. Similarly they are less susceptible to the formation of an electrically conductive deposit between the overlapping layers, the latter being especially troublesome when the cable is laid underground. With self-adhering tapes a sheath may be provided that both in composition and insulating properties is uniform throughout its thickness and more likely free of air voids than tapes having a backing.

Because a low adhesion backing or backsizing inhibits the desired self-fusing property, in the past, self-adhering or self-fusing tapes have been stored in rolls wound using a removable liner between layers. But such liners have well known disadvantages. Even under ordinary working conditions their removal is a nuisance and wastes time, and may also be difficult if the liner becomes tightly adhered to the backing. Often it is inconvenient to take both hands from the work object as may be required to strip the liner from the tape. In addition, the liner is a wasted element that adds expense and bulk and requires disposal after the job is completed.

This invention provides self-adhering sheet products that may be wound upon themselves in a storage roll in a relatively relaxed condition without requiring a removable, low adhesion liner.

When the novel product of this invention is a self-adhering or self-fusing electrical insulating tape wound upon itself in a relaxed condition around a spool for storage, the overlapped windings remain distinct and separable by ordinary hand pull even when stored for long periods of time e.g., a year, or when stored under a variety of temperature or atmospheric conditions. But when this same tape is unwound from the roll, and stretched and wrapped in tight overlapping convolutions around a work object, as, for example, a wire splice, after a short period of time the windings become and remain tightly adhered, and, most desirably, the spirally wound layers fuse to a homogeneous sheath having no residual layer boundaries, providing, in the case of insulating tape, a tight, uniform wrapping of insulation.

This novel tape product includes, in general, an elastomeric strip or web of self-adhering or self-fusing sheet material that may be stretched at least about 50% of its original length without severing, and, having on at least one surface of this web, a thin, substantially non-tacky, frangible, preferably continuous barrier layer or coating subject to separating into small particles, typically by shattering, when stretched by substantially less than 50% its length.

The thin barrier coating, which may be of any frangible, electrically insulating varnish, lacquer, or the like, (or other lacquer if the tape is not for electrical insulation) which shatters upon stretching, completely eliminates the requirement for a strippable liner. The coating has been found to quite adequately protect the tape from premature adherence to itself while in roll form, while yet not significantly interfering with the self-fusing properties of the sheet material when stretched and lapped upon itself. As the tape is stretched the coating apparently shatters into tiny fragments which do not interfere with the surface to surface contact of the tape web, whereupon the tape layers adhere to one another and fuse or cold flow in the normal manner. Thus, when the tape is applied to an object by stretching and wrapping the tape around the object in the conventional manner used with self-adhering or self-fusing tapes, self-adhesion occurs in the usual manner.

A tape 10 of this invention is illustrated in section in the drawing. As shown, the tape includes a web 11 of self-adhering, or self-fusing elastomeric sheet material and a thin barrier coating 12.

The web of my new tape may correspond to any of the prior known self-adhering or self-fusing elastomeric sheet materials. For electrical use, with which this invention is primarily concerned, the web material must be of high dielectric strength. The better sheet materials are of compositions characterized by a high degree of tackiness, plasticity, and cohesiveness, which, for example, may be provided by the inclusion of a tacky rubber or resinous tackifier. When either self-adhering or self-fusing tapes are stretched and wrapped around an object, their elastic nature draws an outer convolution tightly against the one inside it, increasing the tendency of the superposed layers to flow together. Even when these materials are rolled for storage in a relatively relaxed condition, enough tension inherently exists in the roll that, without a liner, the windings may become so tightly adhered or fused together especially after long aging, as to make unwinding from the roll impossible.

Preferably, for use as an electrical insulating tape wrappable around an object, the composition of the sheet material forming the tape web should, in addition to having high dielectric strength and the capability of stretching at least 50%, be elastic enough to recover at least ⅓ of the amount by which it is stretched. The material should also be resistant to various environmental conditions, such as heat and cold and the presence of ozone from corona discharge around conductors. The thickness of the tapes may vary widely, e.g. from 10–125 mils. Usually the webs of tapes of this invention will be unitary, although sheet materials can also be made wherein a flowable material constitutes a separate layer on a stretchable rubbery backing to which the material tends to adhere. When such tapes are stretched and spirally wound upon themselves, the layer of flowable material fills the spaces between convolutions to give a solid sheath.

The general requirements for the barrier coating suggest that a variety of varnishes, lacquers, and other materials might be applied satisfactorily. Typically, polymeric materials which form flexible but frangible, thin coatings are used. The chemical nature of the layer is relatively unimportant so long as any ingredients, including solvents or dispersion media, do not interfere with adherence of the coating to the web composition and will not, for example, unduly plasticize the web or interfere with the electrical properties of the tape. The coating should be water insoluble and not deteriorate or soften when subjected to relatively high temperatures and should adhere to the web firmly so as to insure that it will shatter into small dust-like particle-sized fragments upon elongation of the web.

Initially, in the relatively relaxed condition of the tape as it is wound on the roll, the coating should be substantially continuous. Very closely spaced dots of coating material, as may be obtained by coating the web through a screen, have been shown to provide sufficient protection. A satisfactory coating must have sufficient thickness to provide a barrier, the exact thickness needed depending on the nature of the web composition; but the principal objective is to keep the coating quite thin to assure that it will fragment when stretched. Preferably the coating is less than one mil in thickness, and for optimum results it should be less than a half mil thick.

The maximum percentage elongation to which the coating can be stretched before it must shatter varies, depending on the particular web composition used. For the tapes specifically contemplated with this invention, which in use typically are stretched more than 50%, the coating should shatter when stretched substantially less than 50%, preferably no more than about 15% of its original length and more preferably less than about 5%. The necessary firm adherence of the coating to the web typically results with the thin coatings used. So that it will be unobtrusive, the coating is preferably translucent or transparent, and, for use on electrical insulating tapes, the coating should have a high resistivity.

In the following nonlimiting examples, the invention is more specifically described.

Example 1

A tape rollable on itself without a liner was prepared by coating a commercially available self-fusing rubber sheet material ordinarily stored using a removable liner and having the following composition:

| | Parts by weight |
|---|---|
| Copolymer of isobutylene with isoprene, the isoprene comprising 0.6–10 mol percent of the copolymer | 32 |
| Polymer of isobutylene | 18 |
| Copolymer of butadiene and styrene, the styrene comprising 23.5 mol percent of the copolymer | 10 |
| Copolymer of butadiene and styrene, the styrene comprising 85 mol percent of the copolymer | 14 |
| Chlorinated biphenyl 54% chlorine by weight (Aroclor 1254) | 12 |
| Diatomaceous earth silicate filler | 28 |
| Tackifiers, stiffeners and other additives | 10 |

The coating treatment comprised brush coating the sheet material with a 20% by weight solution of methyl methacrylate in a ketone or ketone-aromatic hydrocarbon mixture (Humiseal 1B12) diluted to 6% solids by weight with methyl ethyl ketone, and then oven drying the coated sheets at 150° F., whereupon strips of the coated sheet material were wound in storage rolls.

After being stored 24 hours at 150° F. these linerless rolls of tape could be unwound at 50 inches/minute, using a pulling force of approximately 30 ounces/inch of width.

After seven days at 150° F., a force of about 85 ounces/inch of width was required for the same rate of unwinding. After the 24 hour storage period the surfaces of the tapes were not disturbed by unwinding, while the surfaces of those stored seven days were only slightly disturbed.

For comparison, strips of the commercial sheet material were wound without a liner into storage rolls. After 24 hours in roll form at 150° F. these unprotected tapes could be unwound with care but the surface was badly disrupted, while after seven days at 150° F. the tapes were fused solid.

Twenty-four hours after being unwound from the rolls and wrapped on a test tube at 200% elongation, the linerless coated tapes of the example, both aged and unaged, were difficult to remove.

Example 2

The formulation of Example 1, except that, instead of 14 parts of the second-listed copolymer of butadiene and styrene, 28 parts were used, was mixed in a Banbury Internal Mixer at 265° F., milled, and calendered at 210° F. on a crepe paper intermediate liner as a 30 mil film. Four different solutions of a high molecular weight methyl methacrylate polymer (Lucite 2041) in methyl ethyl ketone—at 10, 12.5, 15 and 17.5% solids by weight, the samples being labelled A–D in order of increasing solids content—were wiped onto separate strips of the rubber film from a dip tank equipped with a 120 line knurled steel primer roll against which the film was pressed at contact pressure by a rubber roll. From the dip tank the film traveled over a 230° F. hot can and through a 200° F. drying oven at 3 feet/minute. The crepe liner was then removed and the resulting tape product wound on tape cores.

Rolls of each of the samples A–D were aged seven days, some at 120° F. and some at 150° F. After the 120° F. aging cycle, all the tapes unwound very easily, though the A lots (coated with a solution having 10% solids content) exhibited a slight surface dulling or marring. These tapes aged at 120° F. were then wrapped stretched on a steel rod for one hour at room temperature, after which all except sample D could be unwrapped at most two laps before they were too self-adhered to be unwrapped without breaking; sample D could be unwrapped four laps before it broke.

The rolls of tape aged at 150° F. were unwound with, at most, very slight dulling of the surface, except that the sample A tape was somewhat difficult to unwind without stretching the tape and dulling the surface. After being wrapped in the elongated position around a rod for two days, none of the samples could be unwound at all.

To determine whether the coatings interfere with low temperature self-adherence of tape wrapped in the elongated condition, previously untested rolls of each of the samples A–D were also stored in a cold box at 10° F. for three hours. While in the cold box they were unwound, stretched onto a cold steel rod, and left for five hours. When examined, only sample D could be unwound at all, and only the first two laps of that sample could be unwound.

Example 3

Six different samples of tape rollable on itself without a liner were prepared by brush coating with three different solutions of methyl methacrylate lacquer three sets of strips of each of two kinds of tape. One kind of tape was a polyethylene based self-fusing tape sold as Bi-Seal Self Bonding Electrical Tape No. A–2 and manufactured by Bishop Manufacturing Corporation under U.S. Patent No. 2,569,540. The other was a silicone rubber self-fusing tape sold as CHR Tape 4430 Silicone Rubber Electrical Tape and manufactured by The Connecticut Hard Rubber Company. The three samples of each type were labeled A-C. The sample A tapes were coated with a solution prepared by diluting with methyl ethyl ketone a 20% solids by weight solution of methyl methacrylate in a ketone or ketone-aromatic hydrocarbon solvent (Humiseal 1B12), to 6.66% solids by weight. The solutions of samples B and C were prepared by further diluting the solution of sample A—to 3.33% solids by weight in sample B, and to 2.22% in sample C.

Sample rolls of each type were conditioned for seven days at 120° F. After this period all the rolls could be unwound easily. The tapes were then wrapped elongated on a steel rod. Upon unwinding after two hours the silicone tape samples tore after one or two laps were unwound, except for lot C which could be unwound with care, and the polyethylene tapes were unwound with a medium force of unwinding. After three days the polyethylene tape samples could be unwound, but with difficulty.

Besides the frangible protective coatings listed in the above examples, I have also successfully tested the following coating compositions on similar self-adhering films: chlorinated polypropylene dissolved in toluol; methyl, ethyl and isobutyl methacrylates dissolved in methyl ethyl ketone; polystyrene dissolved in toluol; styrene-maleic copolymer dissolved in ethanol; and a bisphenol A-epichlorhydrin copolymer dissolved in ethyl Cellosolve. In addition, an insulating enamel dissolved in xylol and a water dispersed flat indoor latex paint proved satisfactory.

While the invention has been described with particular reference to electrical insulating tapes, it is generally applicable to other stretchable, self-adhering tapes or wrappings as for example to self-adhering, stretchable surgical tapes (see Patent No. 2,077,299) or tapes used as a protective wrap for underground pipes or other surfaces exposed to corrosive environments.

What is claimed is as follows:

1. An elastic stretchable self-adhering sheet product rollable on itself for storage without a removable liner comprising an elastic flowable self-adherent web that is stretchable by at least about 50 percent its original length without severing and that when so stretched and wrapped in tight overlapping convolutions forms a sheath in which the convolutions tend to flow together and lose their identity, and a thin substantially non-tacky substantially continuous frangible polymeric film firmly coated over at least one surface of the web and subject to shattering when stretched by substantially less than 50 percent its original length, said film in the elongated condition of the sheet product being fragmented and separated to permit self-adhesion between superposed portions of the sheet product.

2. An elastic stretchable self-adhering sheet product rollable on itself for storage without a removable liner comprising an elastic flowable self-adherent web that is stretchable by at least about 50 percent its original length without severing and that when so stretched and wrapped in tight overlapping convolutions forms a sheath in which the convolutions tend to flow together and lose their identity, and, disposed over at least one surface of the web, a thin substantially non-tacky substantially continuous layer firmly adherent to the web and subject to separating in small particles when stretched by substantially less than 50 percent its original length to permit self-adhesion between superposed portions of the sheet product.

3. The sheet product of claim 2 in which the substantially continuous layer comprises closely spaced polymeric film particles.

4. An elastic stretchable self-adhering sheet product rollable on itself for storage without a removable liner comprising a flowable self-adherent cohesive elastomeric unitary sheet that is stretchable by at least about 50 percent its original length without severing, and that when so stretched and wrapped in tight overlapping convolutions forms a sheath in which the convolutions tend to flow together and lose their identity; and a thin substantially non-tacky substantially continuous hard frangible polymeric film firmly coated over at least one surface of the sheet and subject to shattering when stretched more than about 15 percent its original length, said film in the elongated condition of the sheet product being fragmented and separated to permit self-adhesion between superposed portions of the sheet product.

5. The sheet product of claim 4 in which the self-adherent sheet includes polymers based on isobutylene.

6. The sheet product of claim 4 in which the polymeric film is based on methacrylate.

References Cited

UNITED STATES PATENTS

| | | | |
|---|---|---|---|
| 2,129,665 | 9/1938 | Barrett et al. | 260—2 |
| 2,227,787 | 1/1941 | Laufer | 117—92 |
| 2,569,540 | 10/1951 | Selby | 260—27 |
| 2,633,430 | 3/1953 | Kellgren et al. | 117—60 |
| 3,027,271 | 3/1962 | Plasse et al. | 117—76 |
| 3,027,279 | 3/1962 | Kurka et al. | 117—232 |
| 3,112,357 | 11/1963 | Imhof | 174—121 |
| 3,218,185 | 11/1965 | Letteron | 117—21 |
| 3,252,833 | 5/1966 | Skobel | 117—231 |
| 3,264,136 | 8/1966 | Hedge | 117—138.8 |

WILLIAM D. MARTIN, *Primary Examiner.*

W. D. HERRICK, *Assistant Examiner.*